(12) United States Patent
Meyuhas et al.

(10) Patent No.: US 12,013,337 B2
(45) Date of Patent: Jun. 18, 2024

(54) AGENTS ON PRINT MEDIA

(71) Applicant: HEWLETT-PACKARD DEVELOPMENT COMPANY, L.P., Spring, TX (US)

(72) Inventors: Noam Meyuhas, Ness Ziona (IL); Guy Nesher, Ness Ziona (IL); Eviatar Golan, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 429 days.

(21) Appl. No.: 16/605,888

(22) PCT Filed: Mar. 30, 2018

(86) PCT No.: PCT/US2018/025320
§ 371 (c)(1),
(2) Date: Oct. 17, 2019

(87) PCT Pub. No.: WO2019/190544
PCT Pub. Date: Oct. 3, 2019

(65) Prior Publication Data
US 2021/0300075 A1    Sep. 30, 2021

(51) Int. Cl.
*B41J 11/00*    (2006.01)
*G01N 21/3554*    (2014.01)

(52) U.S. Cl.
CPC .... *G01N 21/3554* (2013.01); *B41J 11/00216* (2021.01)

(58) Field of Classification Search
CPC .. G01N 21/59; G01N 21/3554; G01N 21/314; G01N 21/359; G01N 21/85; G01N 2201/002; G01N 2201/12; G01N 1/30; G01N 1/312; G01N 2001/4027; G01N 33/18; G01N 33/367; G01N 25/56; G01N 25/60; G01N 7/14; G01N 2021/3148;
(Continued)

(56) References Cited

U.S. PATENT DOCUMENTS

| | | | |
|---|---|---|---|
| 3,674,729 A | | 7/1972 | Mirick |
| 5,442,435 A | * | 8/1995 | Cooper .................. G01N 21/43 356/133 |

(Continued)

FOREIGN PATENT DOCUMENTS

| | | |
|---|---|---|
| CN | 101623960 A | 1/2010 |
| CN | 102667445 A | 9/2012 |

(Continued)

*Primary Examiner* — Hoa Q Pham
(74) *Attorney, Agent, or Firm* — Jordan IP Law, LLC

(57) ABSTRACT

An example apparatus for determining dryness of an agent on print media includes an infrared prism, a source of infrared radiation to direct infrared radiation into the infrared prism, and a detector. The infrared prism includes a surface, the surface having an outer side to contact a portion of the agent on the print media, the infrared prism having a refractive index that is higher than a refractive index of the agent. The source of infrared radiation is to direct infrared radiation into the infrared prism and onto an inner side of the surface. The detector is to generate a signal based on infrared radiation reflected by the inner side of the surface to indicate the dryness of the portion of the agent.

20 Claims, 3 Drawing Sheets

(58) Field of Classification Search
CPC ...... G01N 2021/354; G01N 2021/8521; F01K 5/00; F01K 5/02; F01K 13/003
USPC .................................................. 356/432–440
See application file for complete search history.

(56) References Cited

U.S. PATENT DOCUMENTS

| | | | |
|---|---|---|---|
| 6,079,433 A * | 6/2000 | Saarem | A01G 25/167 |
| | | | 137/1 |
| 8,763,447 B2 | 7/2014 | Nagoshi et al. | |
| 8,987,669 B2 | 3/2015 | Eichhorn et al. | |
| 9,303,185 B2 | 4/2016 | Sambhy et al. | |
| 9,376,582 B1 | 6/2016 | Dannhauser et al. | |
| 2004/0099806 A1 | 5/2004 | Shelley et al. | |
| 2006/0043270 A1 * | 3/2006 | Zimmerman | G01N 21/552 |
| | | | 250/227.25 |
| 2009/0098308 A1 | 4/2009 | Tawaraya et al. | |
| 2010/0002038 A1 * | 1/2010 | Onozawa | B41J 11/0015 |
| | | | 347/17 |
| 2011/0252871 A1 | 10/2011 | Nagoshi et al. | |
| 2012/0056969 A1 | 3/2012 | Kato et al. | |
| 2014/0043417 A1 | 2/2014 | Wuesten et al. | |
| 2014/0204426 A1 | 7/2014 | Levi | |
| 2014/0250988 A1 | 9/2014 | Eichhorn et al. | |
| 2015/0097906 A1 | 4/2015 | Beier et al. | |
| 2015/0360480 A1 | 12/2015 | Bugner et al. | |
| 2016/0193851 A1 | 7/2016 | Childers | |
| 2016/0251532 A1 | 9/2016 | Yano et al. | |
| 2017/0320349 A1 | 11/2017 | Matsumoto et al. | |
| 2017/0341418 A1 | 11/2017 | Paul et al. | |
| 2020/0292979 A1 * | 9/2020 | Schneider | G03G 15/10 |

FOREIGN PATENT DOCUMENTS

| | | |
|---|---|---|
| EP | 0801300 A2 | 10/1997 |
| WO | WO2017185122 A1 | 11/2017 |
| WO | 2018/014938 A1 | 1/2018 |

* cited by examiner

AGENTS ON PRINT MEDIA

BACKGROUND

Agents such as print agents and primers may be applied to a substrate in liquid form, including water or a solvent, and subsequently dried. Drying the water or solvent may comprise evaporation of some or all of the water or solvent.

A primer, for example, applied to a substrate may allow print agent to adhere to the substrate and primer. However, if the primer contains too much or too little water, there may be undesirable results, such as for example a lower adhesion of the print agent to the substrate and primer.

BRIEF DESCRIPTION OF DRAWINGS

Examples will now be described, by way of non-limiting example, with reference to the accompanying drawings, in which.

DETAILED DESCRIPTION

Figure 1:
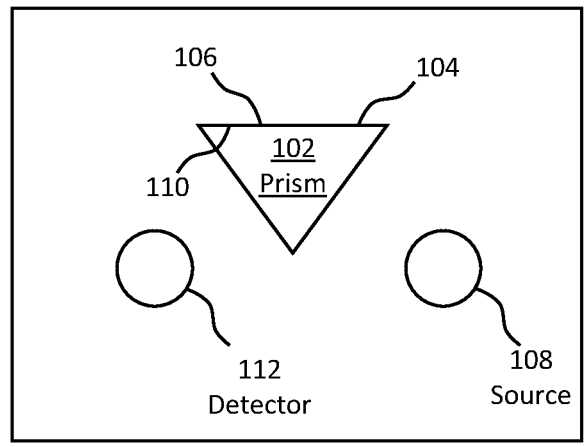
FIG. 1 is a simplified schematic of an example of an apparatus for determining dryness of an agent on print media.

FIG. 1 is a simplified schematic of an example of an apparatus 100, for example for determining dryness of an agent on print media. The apparatus 100 comprises an infrared prism 102 including a surface 104. The infrared prism 102 may be for example an infrared optical prism, in that it is transparent, substantially transparent or translucent to infrared radiation of one or more frequencies. In some examples, the infrared prism 102 may comprise a material such as zinc selenide, zinc sulfide, silicon, thallium-bromide-iodide (KRS-5), germanium, diamond, cadmium telluride, AMTIR (GeAsSe glass) or any other suitable material. The infrared prism 102 may or may not be a geometric prism. That is, for example, the infrared prism 102 may in some examples be a solid geometric figure whose two ends are similar, equal, and parallel rectilinear figures, and whose sides are parallelograms. In other examples, the infrared prism 102 may have another shape.

The surface 104 has an outer side 106 to contact a portion of the agent on the print media, and has a refractive index that is higher than a refractive index of the agent. In some examples, the agent is primer or print agent.

The apparatus 100 also includes a source 108 of infrared radiation, for example infrared radiation to fully or at least partially pass through at least a portion of the infrared prism 102. The source 108 of infrared radiation is to direct infrared radiation into the infrared prism 102 and onto an inner side 110 of the surface.

The apparatus 100 comprises a detector 112 to generate a signal based on infrared radiation reflected by the inner side 110 of the surface 104 to indicate the dryness of the portion of the agent.

In some examples, as the refractive index of the infrared prism 102 is higher than the refractive index of the agent on the print media, the radiation will undergo total internal reflection or frustrated total internal reflection at the surface 104, and will be directed back into the prism 102. However, an evanescent wave will propagate beyond the outer side 106 of the surface 104 and may interact with the agent on the print media. For example, the evanescent wave may transfer some energy from the infrared radiation into the print media. The amount of energy that is transferred may be dependent on a property of the portion of the agent that is in contact with the outer side 106 of the surface 104, such as for example the dryness of the portion of the agent. Therefore, the signal from the detector 112, which may represent for example an intensity of infrared radiation reflected at the inner side 110 of the surface 104 and onto the detector 112, may indicate a dryness of the portion of agent on the print media. In some examples, the infrared radiation in the evanescent wave may be absorbed by molecules in the portion of the agent to a degree dependent on the number, concentration and/or state of molecules in the portion of the agent. In some examples, the frequency of the infrared radiation may be chosen such that molecules of solvent such as water in the portion of the agent absorb the infrared radiation in the evanescent wave. Therefore, the intensity of reflected infrared radiation detected by the detector 112 may be inversely proportional to the number of concentration of solvent or water molecules in the portion of agent, and hence proportional to the "dryness" of the portion of agent.

In some examples, the dryness of the portion of the substrate may be determined by comparing the signal from the detector 112 to a calibrated signal. The calibrated signal may be, for example, a signal that is provided by the detector 112 when there is no print media or agent in contact with the outer surface 106 of the surface 104 of the infrared prism 102, or when print media with no agent is in contact with the outer surface 106 of the surface 104 of the infrared prism 102.

Figure 2:
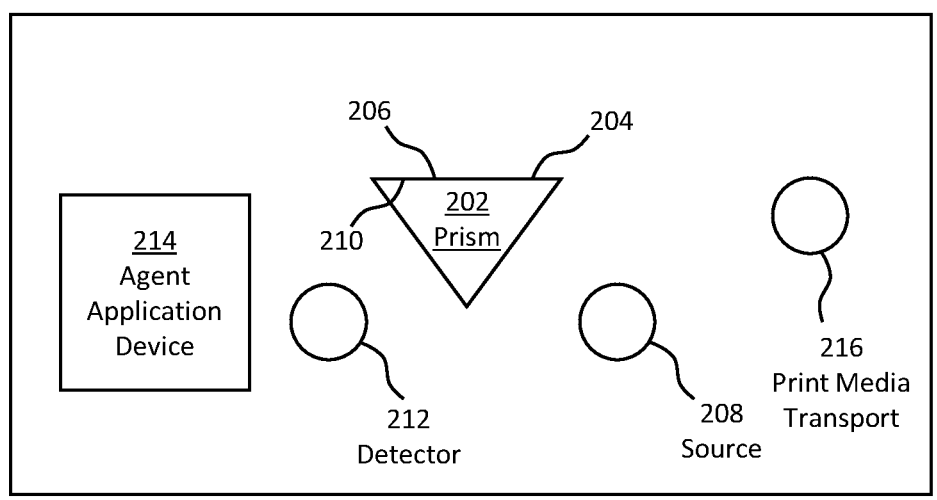
FIG. 2 is a simplified schematic of an example of an apparatus for determining dryness of an agent on print media.

FIG. 2 is a simplified schematic of an example of apparatus 200, for example apparatus for determining dryness of an agent on print media. The apparatus 200 comprises an infrared prism 202 including a surface 204, the surface 204 having an outer side 206 to contact a portion of the agent on the print media. The infrared prism 202 has a refractive index that is higher than a refractive index of the portion of the agent on the print media.

The apparatus 200 also comprises a source 208 of infrared radiation to direct infrared radiation into the infrared prism 202 and onto an inner side 210 of the surface 204, and a detector 212 to generate a signal based on infrared radiation reflected by the inner side 210 of the surface 204 to indicate the dryness of the portion of the agent. In some examples, the components 202-212 in FIG. 2 may be similar to corresponding components 102-112 shown in FIG. 1.

The apparatus 200 also includes an agent application device 214 to apply the agent to the print media. The agent application device 214 is to control application of the agent to the print media based on the signal from the detector 212. For example, the signal may be provided to the agent application device 214 to the agent application device 214, or to a controller (not shown) that controls the agent application device 214 based on the signal. In some examples, the agent application device 214 may apply more or less agent to the print media in response to the signal. For example, if the dryness of the portion of the agent is too low, or a moisture or solvent level in the portion of the agent is too high, the device 214 may reduce an agent application rate so as to apply less agent to the print media and allowing the agent to dry more quickly. Conversely, the agent application rate may be increased if the dryness of the portion of the agent is too high. Thus, in some examples, the application of agent to the print media may be controlled such that the dryness of the applied agent is at a particular level or within a predetermined range when it contacts the outer side 206 of the surface 204. In some examples, the agent is primer, and so the application of primer to the print media may be controlled such that the dryness of the primer is at a particular level or within a predetermined range when it reaches a print apparatus (not shown) downstream of the agent application device 214, wherein the print apparatus applies print agent onto the primer on the print media.

The apparatus 200 further comprises print media transport 216 to transport the print media through the apparatus 200 based on the signal. The print media transport 216 may comprise, for example, one or more rollers, pinch rollers, conveyors and/or any other suitable transport. The print media transport 216 may transport the print media through the apparatus 200 based on the signal. For example, the speed of the print media may be controlled by the transport 216 based on the signal such that the dryness of the applied agent is at a particular level or within a predetermined range when it contacts the outer side 206 of the surface 204.

In some examples, the outer side 206 of the surface 204 of the infrared prism 202 is to continuously contact the print media. Therefore, the print media may slide along the surface 204 as it is being transported through the apparatus 200 by the print media transport 216. The signal provided by the detector 212 may therefore be continuous or produced or taken at any time. Alternatively, the infrared prism 202 is moveable such that the outer side 206 of the surface 204 of the infrared prism 202 is to contact the print media when the detector 212 is to generate the signal. That is, for example, when a measure of the dryness level of the portion of the agent on the print media is desired, the infrared prism 202 is moved accordingly. This may be achieved for example using motors.

In some examples, the detector is to generate the signal based on intensity of infrared radiation of a predetermined wavenumber reflected by the inner side of the surface. The predetermined wavenumber may be one that is chosen so as to be absorbed by the portion of the agent on the print media by an amount that is dependent on the dryness of the portion of print media. In some examples, the source 208 of infrared radiation is to provide infrared radiation with the predetermined wavenumber. In some examples, the predetermined wavenumber is 3200-3600 $cm^{-1}$. Infrared radiation with a wavenumber within this wave may be absorbed by water molecules in the portion of agent to a degree dependent on the number or concentration of water molecules, and hence to a degree dependent on the dryness of the portion of agent. In some examples, the predetermined wavenumber corresponds to a wavelength of 2950 nm, and thus the radiation source 208 may be for example a laser providing radiation at that wavelength.

Figure 3:
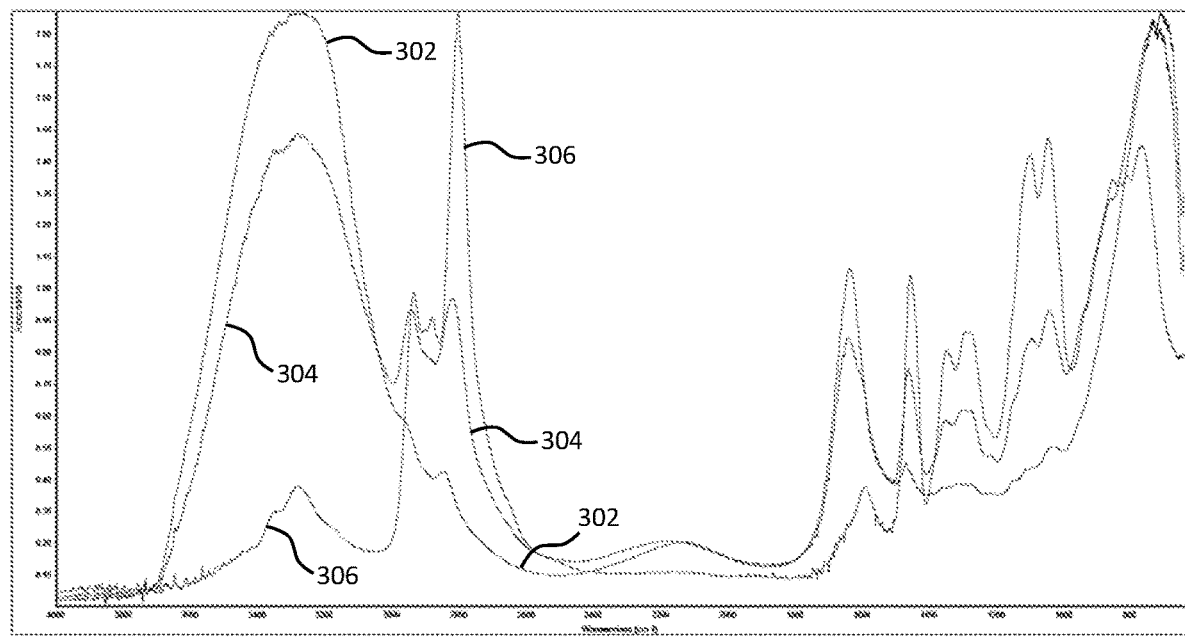
FIG. 3 is a graph of examples of absorbance spectra for an agent at various levels of dryness.

FIG. 3 is a graph 300 of examples of absorbance spectra for an agent at various levels of dryness. In this example, the agent is primer. A first absorbance spectrum 302 is a spectrum where the dryness is relatively low, i.e. there is a relatively large amount of water in the primer. As a result, the absorbance at a wavenumber of 3200-3600 $cm^{-1}$ is relatively high. Also, absorbance at a wavenumber of around 2800 $cm^{-1}$ is relatively low. A second absorbance spectrum 304 represents a medium dryness level and shows a medium absorbance at around 3200-3600 $cm^{-1}$ and around 2800 $cm^{-1}$. A third absorbance spectrum 306 represents a relatively high dryness level, i.e. a relatively low amount of water in the primer, and shows a low absorbance at 3200-3600 $cm^{-1}$, and a high absorbance at around 2800 $cm^{-1}$. Hence, in some examples, a dryness level of an agent such as primer may be inversely proportional to the absorbance at some wavelengths, and proportional to the absorbance at other wavelengths. For the example primer discussed above, the dryness level may be inversely proportional to the absorbance at a wavenumber associated with water (e.g. 3200-3600 $cm^{-1}$), or proportional to the absorbance at another wavenumber (e.g. around 2800 $cm^{-1}$). In some examples, wavenumbers and their expected absorbances at various dryness levels may be predetermined, such as for example determined experimentally, or provided by a manufacturer of the agent or another source.

In some examples, a measurement of absorbance at one or more predetermined wavelengths may be taken and used to determine a dryness level of agent on print media. For example, for the primer discussed above, a measurement may be taken at one or more wavelengths in the range 3200-3600 $cm^{-1}$, and/or one or more wavelengths around 2800 $cm^{-1}$. In other examples, a spectrum over a range of wavenumbers may be measured, such as for example around 600-4000 $cm^{-1}$ or any other suitable range, and measurements can be taken at appropriate wavelengths from the spectrum.

In some examples, properties of the apparatus may be controlled based on the dryness level. For example, a print media transport may be controlled and/or an agent application device may be controlled such that the dryness of the agent on the print media is at a desired level or within a desired range. For example, the absorbance at one or more wavelengths may be at a desired level or within a desired range. In some examples, this may ensure that the agent has a suitable dryness level for subsequent use of the agent (such as for example where the agent is primer, application of print agent onto the primer). For example, a drying apparatus (not shown) may be controlled to dry the agent more quickly or more slowly, and/or a transport may be controlled to move the print media more slowly or more quickly.

Figure 4:
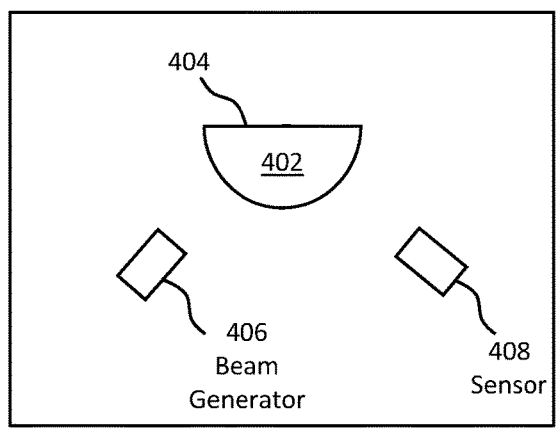
FIG. 4 is a simplified schematic of an example of a system to determine a solvent level of a substance on a substrate.

FIG. 4 is a simplified schematic of an example of a system 400, for example to determine a solvent level of a substance on a substrate. The system 400 comprises an infrared-transparent article 402, such as for example an infrared optical prism or other infrared-transparent object. A surface 404 of the article 402 is to touch a part of the substance on the substrate, and wherein a refractive index of the substance is lower than a refractive index of the article 402. This may ensure for example total internal reflection or frustrated total internal reflection at the surface within the article 402.

The apparatus 400 also includes an infrared beam generator 406 to generate an infrared beam and to direct the infrared beam into the article 406. The infrared beam may be, for example, at a wavelength or wavenumber whose absorbance by the substance on the substrate is indicative of a solvent level (e.g. number or concentration of molecules of a solvent) of the part of the substance on the substrate. In some examples, the solvent may be water. In some examples, the substance may be primer or print agent.

The apparatus 400 further comprises a sensor 408 to receive a reflected infrared beam reflected internal to the article 402 at the surface 404 and to provide an indication of the solvent level of the part of the substance in response to the reflected infrared beam.

In some examples, the absorbance of the infrared radiation may be indicative of the solvent level. For example, the infrared radiation may be at or may include a wavelength that is absorbed by the solvent level. In other examples, the wavelength may be chosen so as to indicate the solvent level though may not be at a wavelength that is readily absorbed by the solvent. For example, as shown in FIG. 3, absorbance at 2800 cm$^{-1}$ may indicate dryness, even though radiation at that wavenumber may not be readily absorbed by a solvent such as water.

Figure 5:
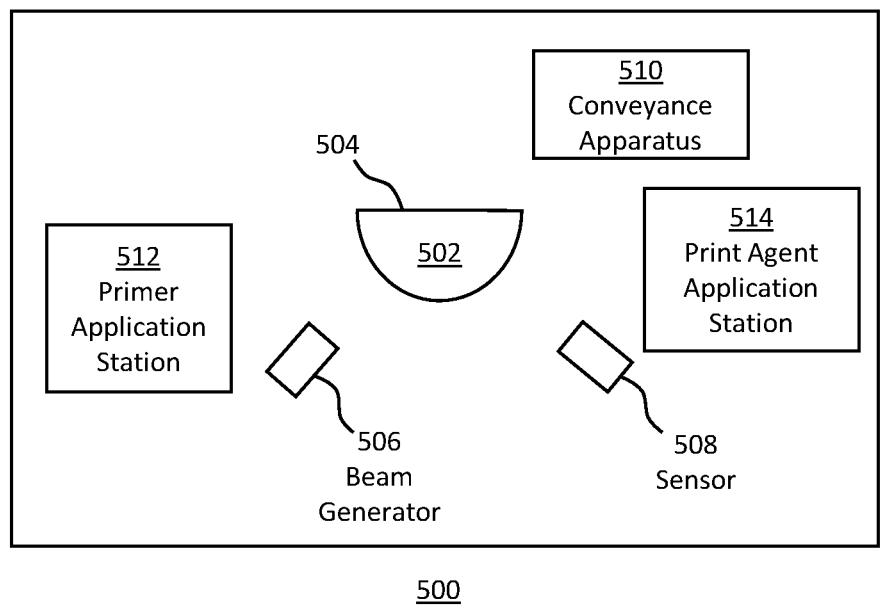
FIG. 5 is a simplified schematic of an example of a system to determine a solvent level of a substance on a substrate.

FIG. 5 is a simplified schematic of an example of a system 500, for example to determine a solvent level of a substance on a substrate. The system 500 comprises an infrared-transparent article 502, wherein a surface 504 of the article is to touch a part of the substance on the substrate, and wherein a refractive index of the substance is lower than a refractive index of the article 502. The apparatus also comprises an infrared beam generator 506 to generate an infrared beam and to direct the infrared beam into the article 502, and a sensor 508 to receive a reflected infrared beam reflected internal to the article 502 at the surface 504 and to provide an indication of the solvent level of the part of the substance in response to the reflected infrared beam. In some examples, the components 502-508 may be similar in at least some respects to components 402-408 of FIG. 4.

The apparatus 500 also includes conveyance apparatus 510 to convey the substrate, a primer application station 512 to apply the primer to the substrate, and a print agent application station 514 to apply print agent to the primer on the substrate. The system is to control the primer application station 512 and/or the print agent application station 514 in response to the indication. For example, the primer application station 512 and/or the print agent application station 514 are controlled such that the indication is at a desired level or in a desired range.

In some examples, the indication indicates an intensity of the reflected infrared beam at a selected wavenumber (e.g. 3200-3600 cm$^{-1}$). Thus, absorbance at this wavenumber, for example absorbance of water if the solvent is water, may indicate the solvent level in the part of the substance on the substrate.

Figure 6:
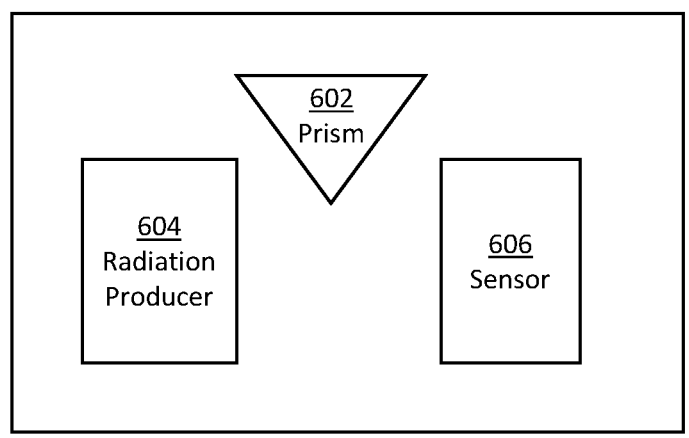
FIG. 6 is a simplified schematic of an example of apparatus to determine a solvent content of agent on print media.

FIG. 6 is a simplified schematic of an example of apparatus 600, for example to determine a solvent content of agent on print media. The apparatus comprises a prism 602 to contact the agent on the print media. The prism 602 is at least partially transparent to infrared radiation at one or more frequencies, and is therefore for example an infrared optical prism. That is, for example, the prism 602 allows at least some or all of the infrared radiation to pass through it. The prism 602 may in some examples also be a geometric prism.

The apparatus 600 also includes an infrared radiation producer 604 to direct infrared radiation into the prism 602 and onto an interface between the prism 602 and the agent on the print media. For example, the interface may be the area of contact between the prism 602 and the agent on the print media. In some examples, the refractive indices of the prism 602 and the agent on the print media may be such that the infrared radiation is at least partially reflected at the interface. However, an evanescent wave may propagate beyond the interface, for example into the agent on the print media, and hence the reflected infrared radiation may have characteristics dependent on the composition of the agent. For example, the reflected radiation may have characteristics dependent on the solvent content (e.g. number of molecules or concentration of solvent) of the agent.

The apparatus 600 comprises a sensor 606 to sense infrared radiation reflected by the interface to determine the solvent content of the agent on the print media. In some examples, the absorption characteristic of the agent on the print media affects the reflected infrared radiation sensed by the sensor 606, and thus the output of the sensor 606 may indicate the absorption characteristic. This may be used to determine the solvent content.

In some examples, the sensor 606 is to sense an intensity of the infrared radiation reflected by the interface at a particular wavelength to determine the solvent content of the agent on the print media. For example, the particular wavelength may be chosen such that the absorption of agent at that wavelength, and thus the intensity of the reflected infrared radiation, is dependent on the solvent content of the agent. Thus the solvent content can be determined from the intensity of the reflected radiation as detected by the sensor 606. In some examples, the particular wavelength corresponds to a wavenumber of 3200-3600 cm$^{-1}$. In some examples, the wavelength is chosen such that the absorption by the agent increases as the solvent content decreases. In some examples, the agent comprises print agent or primer.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. Apparatus for determining dryness of an agent on print media, the apparatus comprising:
    an infrared prism including a surface, the surface having an outer side to contact a portion of the agent on the print media, the infrared prism having a refractive index that is higher than a refractive index of the agent;
    a source of infrared radiation to direct infrared radiation into the infrared prism and onto an inner side of the surface;
    a detector to generate a signal based on infrared radiation reflected by the inner side of the surface to indicate the dryness of the portion of the agent.

2. The apparatus of claim 1, further comprising an agent application device to apply the agent to the print media, and wherein the agent application device is to control application of the agent to the print media based on the signal.

3. The apparatus of claim 1, further comprising print media transport to transport the print media through the apparatus based on the signal.

4. The apparatus of claim 1, wherein the agent comprises one of primer and print agent.

5. The apparatus of claim 1, wherein the outer side of the surface of the infrared prism is to continuously contact the print media.

6. The apparatus of claim 1, wherein the infrared prism is moveable such that the outer side of the surface of the infrared prism is to contact the print media when the detector is to generate the signal.

7. The apparatus of claim 1, wherein the detector is to generate the signal based on intensity of infrared radiation of a predetermined wavenumber reflected by the inner side of the surface.

8. The apparatus of claim 7, wherein the predetermined wavenumber is 3200-3600 $cm^{-1}$.

9. A system to determine a solvent level of a substance on a substrate, the system comprising:
    an infrared-transparent article, wherein a surface of the article is to touch a part of the substance on the substrate, and wherein a refractive index of the solvent is lower than a refractive index of the article;
    an infrared beam generator to generate an infrared beam and to direct the infrared beam into the article;
    a sensor to receive a reflected infrared beam reflected internal to the article at the surface and to provide an indication of the solvent level of the part of the substance in response to the reflected infrared beam.

10. The system of claim 9, wherein the substance comprises primer, and wherein the system comprises:
    conveyance apparatus to convey the substrate;
    a primer application station to apply the primer to the substrate; and
    a print agent application station to apply print agent to the primer on the substrate;
    wherein the system is to control one of the primer application station and the print agent application station in response to the indication.

11. The system of claim 10, wherein the system is to control the primer application station in response to the indication.

12. The system of claim 9, wherein the indication indicates an intensity of the reflected infrared beam at a selected wavenumber.

13. The system of claim 12, wherein the wavenumber comprises 3200-3600 $cm^{-1}$.

14. The system of claim 9, comprising a printer, wherein the substrate is a print media and the substance is a print agent.

15. A method of using the system of claim 9, further comprising:
    bringing the surface of the article into contact with the substrate, which is a print media bearing a print agent;
    sliding the print media over the surface of the article;
    with the sensor, determining a level of solvent in the print agent on the print media; and
    controlling operation of the printer based on the determined level of solvent.

16. The system of claim 9, wherein the sensor is to compare a signal indicative of the reflected infrared beam to a calibrated signal generated by the detector when no substrate or agent is in contact with the article.

17. The system of claim 9, further comprising:
    a print media transport to transport the substrate; and
    a controller to control speed of the print media transport based on the indication of the solvent level on the substrate as output by the sensor.

18. Apparatus to determine a solvent content of agent on print media, the apparatus comprising:
    a prism to contact the agent on the print media;
    an infrared radiation producer to direct infrared radiation into the prism and onto an interface between the prism and the agent on the print media;
    a sensor to sense infrared radiation reflected by the interface to determine the solvent content of the agent on the print media.

19. The printing device of claim 18, wherein the sensor is to sense an intensity of the infrared radiation reflected by the interface at a particular wavelength to determine the solvent content of the agent on the print media.

20. The printing device of claim 18, wherein the agent comprises print agent or primer.

* * * * *